US012668223B2

(12) United States Patent
Plow et al.

(10) Patent No.: US 12,668,223 B2
(45) Date of Patent: Jun. 30, 2026

(54) AIR BRAKE RELEASE SYSTEM AND METHODS FOR THE USE THEREOF

(71) Applicant: Bendix Commercial Vehicle Systems LLC, Avon, OH (US)

(72) Inventors: William R. Plow, Avon, OH (US); John V. Ripley, Elyria, NC (US); Mark A. Matko, North Olmsted, OH (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 414 days.

(21) Appl. No.: 18/538,573

(22) Filed: Dec. 13, 2023

(65) Prior Publication Data

US 2025/0196832 A1     Jun. 19, 2025

(51) Int. Cl.
B60T 13/38          (2006.01)
B60T 13/68          (2006.01)
B60T 17/22          (2006.01)

(52) U.S. Cl.
CPC .......... B60T 13/385 (2013.01); B60T 13/683 (2013.01); B60T 17/22 (2013.01)

(58) Field of Classification Search
CPC .......... B60T 13/26–385; B60T 13/683; B60T 17/22; B60T 7/20
See application file for complete search history.

(56) References Cited

U.S. PATENT DOCUMENTS

| | | | | |
|---|---|---|---|---|
| 7,261,177 | B2 | 8/2007 | Eckelberry | |
| 8,197,015 | B2 * | 6/2012 | Hindman | .................. B60T 7/20 |
| | | | | 303/123 |
| 10,875,497 | B2 * | 12/2020 | Srnec | ...................... B60R 25/08 |
| 12,246,692 | B2 * | 3/2025 | Chapeau | .................. B60T 7/20 |
| 2023/0226934 | A1 * | 7/2023 | Chapeau | ................ B60L 53/14 |
| | | | | 320/109 |
| 2023/0286477 | A1 * | 9/2023 | Chapeau | .................. B60T 7/20 |
| 2024/0428627 | A1 * | 12/2024 | Cornelius | ............ G07C 5/0825 |

FOREIGN PATENT DOCUMENTS

CN          206033208 U   *  3/2017

* cited by examiner

*Primary Examiner* — James J Taylor, II
(74) *Attorney, Agent, or Firm* — Crowell & Moring LLP

(57)          ABSTRACT

An air brake release system includes a shore power detection circuit configured to provide a power detection signal when a shore power supply is detected, a switch moveable between a first position and a second position in response to an air supply, and a solenoid valve operably connected to the shore power detection circuit and the switch. The solenoid valve is moveable between (1) an air supply position when the power detection signal is not being provided by the shore power detection circuit and the switch is moved to the second position, and (2) a non-air supply position when the power detection signal is provided by the shore power detection circuit and the switch is moved to the second position. A method of operating an air brake system is also provided.

20 Claims, 4 Drawing Sheets

AIR BRAKE RELEASE SYSTEM AND METHODS FOR THE USE THEREOF

FIELD OF THE INVENTION

The present application relates generally to an air brake system, and in particular to a system for preventing an accidental release of a parking brake on a trailer, together with methods for the use thereof.

BACKGROUND

Trailers, for example commercial semi-trailers including refrigerated trailers, are often equipped for connection to shore power stations, wherein the trailer may be plugged in to the shore power station before, during and after loading. The semi-trailer may be connected to the shore power, for example, after being disconnected from a semi-tractor, which may otherwise provide power to the semi-trailer. The shore power station may supply power at a relatively high voltage and current to power and charge the semi-trailer systems, including without limitation refrigerating units.

The semi-trailer is safely parked by engaging a parking brake, which is actuated by emptying the trailer pneumatic spring brake chambers and engaging the parking brake with a spring. To disengage the parking brake, the reverse operation is carried out, with the spring brake chamber being filled by an air supply from the semi-tractor (e.g. compressor) such that the pneumatic pressure counters the spring force and releases the parking brake.

In order to safely move the semi-trailer with the semi-tractor, the semi-trailer must be disconnected from the shore power station. Thus, the need remains for a system that alerts an operator that the shore power station is still connected to the semi-trailer before the semi-trailer is moved, and/or prevents the operator from moving the semi-trailer until the shore power is disconnected from the semi-trailer.

SUMMARY

The present invention is defined by the following claims, and nothing in this section should be considered to be a limitation on those claims.

In one aspect, one embodiment of an air brake release system includes a shore power detection circuit configured to provide a power detection signal when a shore power supply is detected, a switch moveable between a first position and a second position in response to an air supply, and a solenoid valve operably connected to the shore power detection circuit and the switch. The solenoid valve is moveable between (1) an air supply position when the power detection signal is not being provided by the shore power detection circuit and the switch is moved to the second position, and (2) a non-air supply position when the power detection signal is provided by the shore power detection circuit and the switch is moved to the second position. In one embodiment, the switch may be a pressure switch.

In another aspect, one embodiment of an air brake release system includes a shore power detection circuit configured to provide a power detection signal when a shore power supply is detected, an air supply line, a switch moveable between a first position and a second position in response to an air supply delivered through the air supply line, an air delivery line, and a solenoid valve. The solenoid valve includes a supply port in communication with the air supply line, a delivery port in communication with the air delivery line, and an exhaust port in communication with the ambient environment. The solenoid valve is moveable between a first position, wherein the supply port and the delivery port are connected, and a second position, wherein the supply port and the exhaust port are connected. The solenoid valve is moveable to the second position when the power detection signal is provided by the shore power detection circuit and the switch is moved to the second position. In one embodiment, the switch is configured as a pressure switch.

In another aspect, one embodiment of a method of operating an air brake system includes connecting a trailer to a shore power supply, wherein the trailer includes a parking brake, detecting the shore power supply with a shore power detection circuit, connecting the trailer to an air supply, moving a switch from a first position to a second position in response to the air supply, and moving a solenoid valve, disposed between the air supply and the parking brake, to an exhaust position in response to detecting the shore power detection signal and moving the switch to the second position, and thereby preventing the air supply from releasing the parking brake.

Various other methods of using the air brake system are also provided.

The various embodiments of the air brake system, and methods for the use thereof, provide significant advantages over other air brake systems and methods. For example, and without limitation, the dual input of power detection and air supply ensures that the parking brake is not released when the semi-trailer is connected to the shore power station. The system is greatly simplified by way of the solenoid valve being moved to the exhaust position only when both inputs are sensed and communicated to the solenoid valve. At the same time, the system provides one or more alert indicia, or alarms, to the user that the shore power station remains connected to the semi-trailer, otherwise ready for transport. The alert indicia, or alarm, may include the parking brake remaining engaged and/or various audio/visual alerts/alarms, including the sound of air being exhausted through the solenoid valve, which may be amplified, for example, by an air horn.

The foregoing paragraphs have been provided by way of general introduction, and are not intended to limit the scope of the claims presented below. The various preferred embodiments, together with further advantages, will be best understood by reference to the following detailed description taken in conjunction with the accompanying drawings.

DETAILED DESCRIPTION OF THE PRESENTLY PREFERRED EMBODIMENTS

It should be understood that the term "plurality," as used herein, means two or more. The term "coupled" means connected to or engaged with, whether directly or indirectly, for example with an intervening member, and does not require the engagement to be fixed or permanent, although it may be fixed or permanent. The terms "first," "second," and so on, as used herein are not meant to be assigned to a particular component so designated, but rather are simply referring to such components in the numerical order as addressed, meaning that a component designated as "first" may later be a "second" such component, depending on the order in which it is referred. It should also be understood that designation of "first" and "second" does not necessarily mean that the two components or values so designated are different, meaning for example a first direction may be the same as a second direction, with each simply being applicable to different components.

Figure 1:
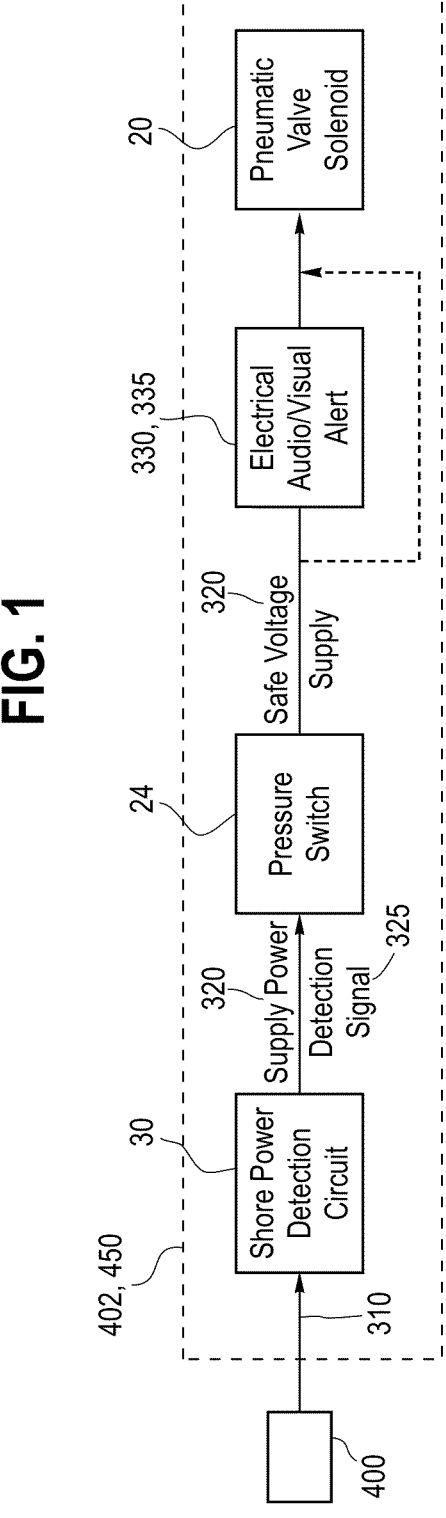
FIG. 1 is a schematic diagram of one embodiment of an electrical circuit for the air brake system.

Referring to FIGS. 1 and 2-A-C, an air brake system 450, located for example on a trailer 402, includes a shore power detection circuit 30, otherwise referred to as an electrical detection and supply circuit. The shore power detection circuit 30 performs at least two functions, including voltage conversion and shore power detection.

First, the shore power detection circuit converts shore power 310, supplied at a high voltage and received from a shore power station 400, to a system power 320 supplied at a low voltage, with the low voltage system power supply 320 being suitable for use with pneumatic sensing and control devices. The phrase "low voltage system power supply" refers to a supply that does not satisfy the definition of a High voltage source as defined in F.M.V.S.S. 305 S4 Definitions (Code of Federal Regulation, Title 49, Subtitle B, Chapter V, Part 571, Subpart B, Subsection 305, Section 4 Definitions). For example, and without limitation, the shore power 310 may be delivered at 480 VAC. However, other voltages may be suitable, with the voltage level supplied to a semi-trailer 402 provided by an electrical supply fixed to another structure (e.g. building, ground or additional energy supply vehicle). The 480 VAC is an example of a voltage level that may be supplied to the subject trailer 402. Other voltage levels may be suitable, including Alternating Current (AC) or Direct Current (DC) systems. The circuit 30 is coupled to, or disposed on, the semi-trailer 402.

In addition, the shore power detection circuit 30 is configured to provide, and provides, a shore power detection signal 325 when a shore power supply 310 is detected, i.e., indicating that the shore power 310 is connected to the circuit 30, disposed on the semi-trailer 402. The supply power 320 and detection signal 325 may be separate and distinct, or integrated as a single electrical signal, as shown for example in FIG. 1.

Figure 2A:
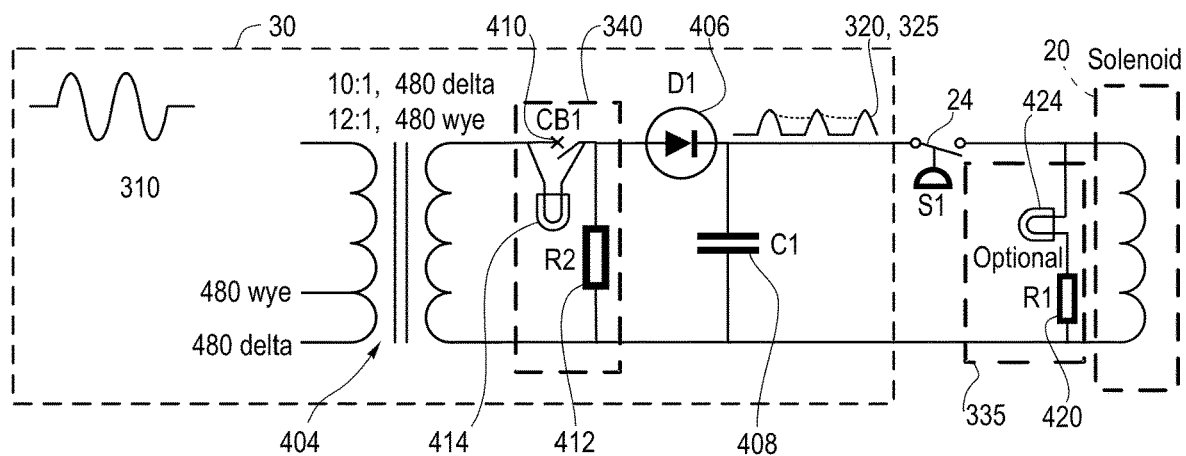
FIG. 2A-2C are alternative embodiments of a voltage detection and supply circuit.
Figure 2B:
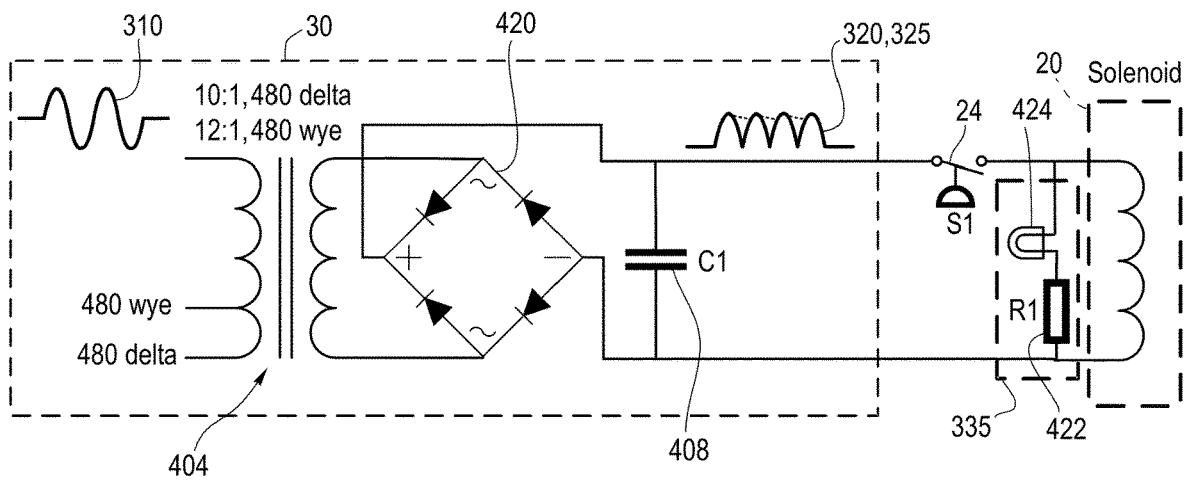
Figure 2C:
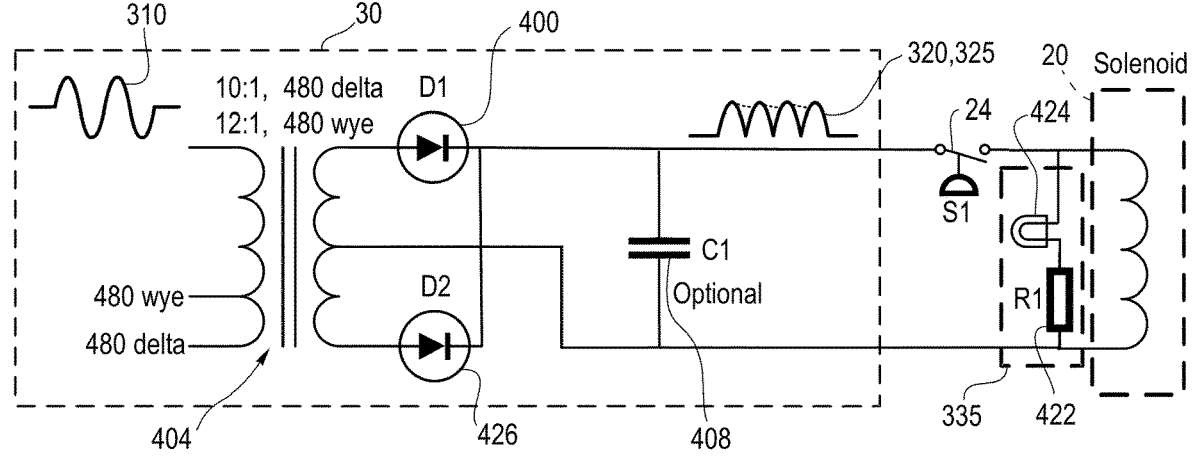

FIGS. 2A-2C illustrate various shore power detection circuits 30, which may include a transformer 404, for example a delta/wye transformer, which is configured to convert, and does convert, the high voltage shore power supply 310 to the low voltage system power supply 320. In the exemplary circuit illustrated in FIG. 2A, the circuit 30 includes a single diode 406 and capacitor 408. The circuit may also include an optional circuit protector 340 and monitoring component, which may include a circuit breaker 410 and resistor 412, together with an LED 414.

Referring to FIGS. 2B and 2C, alternative embodiments of the circuits 30 include full wave rectifiers. In the embodiment of FIG. 2C, the circuit includes a transformer 404, an optional capacitor 408, and a pair of diodes 406, 426. In the embodiment of FIG. 2B, the circuit 30 includes a transformer 404, an optional capacitor 408, and a diode bridge 420. Any of the embodiments of FIGS. 2A-C may include a powered (e.g., electrically and/or pneumatic) audio and/or visual alert or alarm component 335, which may include a resistor 422 and LED 424, or control device(s), such as, but not limited to, an automated shore power ejection system (including any precursor steps to remove shore power). The alert component 335, or alarm, may provide an electrically powered audio or visual alert to an operator of the tractor and trailer. Examples of an audio alerts or alarms may include, without limitation, buzzers, horns, and/or beepers. The visual alert may be a light, including for example and without limitation a Light Emitting Diode (LED), incandescent light bulb, strobe and/or another circuit/supply triggered by a signal from the circuit 30. The audio/video alert component 335 may be directly connected or wirelessly controlled by the circuit 30. The alert components, or alarms, provide a visual and/or audible alert when the power detection signal 325 is provided by the shore power detection circuit 30 and an air supply 452 is connected to the trailer 402. If the shore power 310 is disconnected from the trailer 402, then the alert components 335 will not receive a signal and will be disarmed.

The circuits shown in FIGS. 1-2C for conversion of the shore power 310 to the system power 320, and for creating a shore power detection signal 325, are exemplary and it should be understood that the dual function may be implemented in a single physical device and/or multiple physical devices on the subject trailer 402 as the location of each electrical and/or pneumatic element may integrate naturally into already available enclosures and/or devices.

Figure 3:
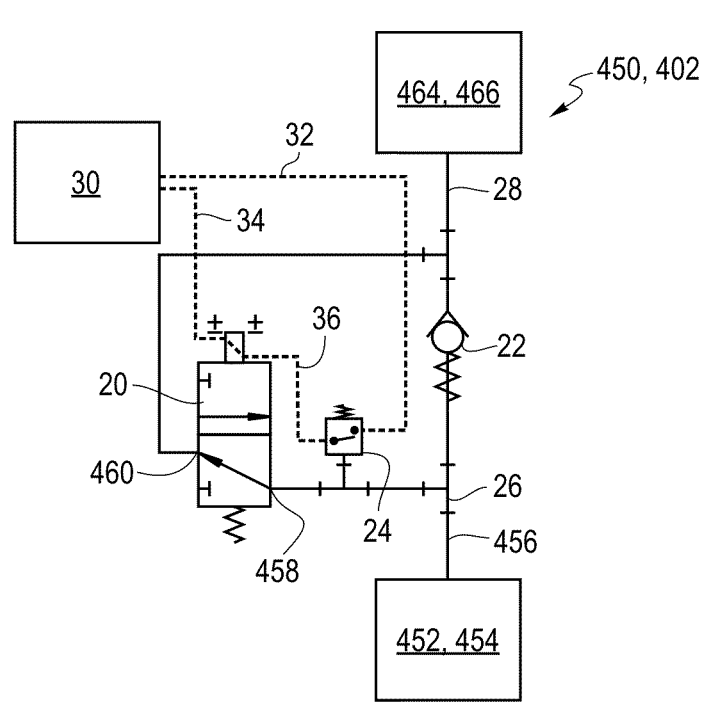
FIG. 3 is schematic illustration of one embodiment of an air brake system in a normal semi-trailer supply line fill configuration.

Referring to FIGS. 1 and 3, the air brake system 450 includes an air supply line 26, which may be connected to the air supply source 452, for example a compressor located on a semi-tractor 454. Air enters the system 450 through the supply line 26 from a corresponding supply line 456 of the tractor 454. Pressurized air is communicated to a port of a one-way exhaust valve 22, which remains closed by way of a spring force and the force of the pressurized air, a switch 24 and a supply port 458 of a 3/2 (three port/two position) solenoid valve 20, through the supply line 26. In one embodiment, the switch 24 is configured as a normally open pressure switch. The switch 24, e.g. pressure switch, is moveable between a first position (normally open) and a second position (closed) in response to the air supply. Specifically, the positive pressure of the air supply closes the switch 24, or moves the switch 24 from the first position to the second position. It should be understood that the switch may be a normally closed pressure switch, which when opened completes an electrical circuit communicating with the solenoid valve 20. In other embodiments, the switch 24 refers to a device that provides an electronic signal when the air supply is detected as being connected to the trailer, for example including a system where data is communicated from other components on the trailer (such as connectors, pressure and/or flow sensors, etc.) and processed to provide a signal to the solenoid valve 20. The device would "move" to a second position by not communicating a signal, or by communicating a different signal. The pressurized air supply passes through the solenoid valve 20, which is in a first position, and out of a delivery port 460 through air supply line 28 to a spring brake control valve 464 and parking brake 466 of the trailer. In this configuration, no shore power 310 is being supplied to the trailer, such that the shore power detection circuit 30 does not send any signal to the solenoid valve 20, which remains in the first position with the supply port 458 and the delivery port 460 in fluid communication. The spring parking brake 466 is moveable to a release position in response to the air supply.

5

Figure 4:
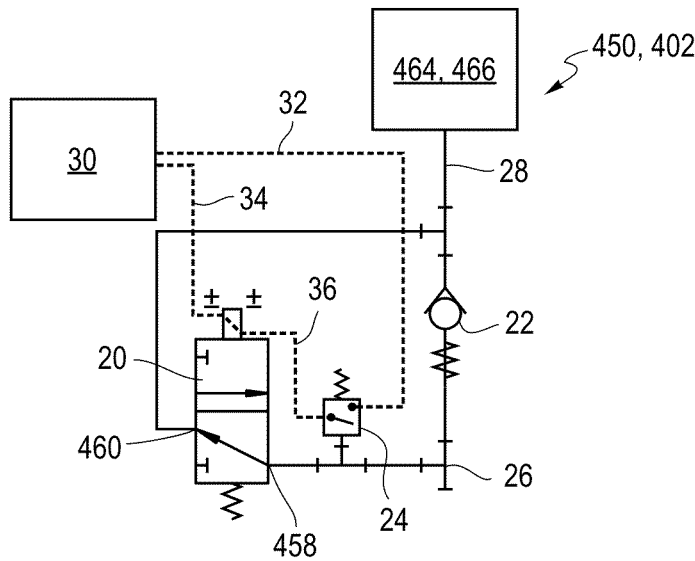
FIG. 4 is schematic illustration of one embodiment of the air brake system in a normal semi-trailer supply line exhaust configuration.

Referring to FIG. 4, the air supply 452 and tractor 454 are disconnected from the supply line 26. The solenoid valve 20 is moveable to the first position when no power detection signal is 325 being provided by the shore power detection circuit 30 and the pressure switch 24 is moved to the first position (i.e., open position). The delivery port 458 and supply port 460 are in fluid communication. The air supply line 28 may then be exhausted, with the air following a reverse path of the supply line fill of FIG. 3, meaning air may pass back through the solenoid valve 20, which is in the first position, and out the supply line 26. In addition, the majority of the supply air will pass through supply line 28 to the one-way exhaust valve 22, which may be configured as a spring check valve, causing the one-way exhaust valve 22 to open and pass the air directly to supply line 26 and then to the ambient environment. As the air is removed, or exhausted, from the system, the switch 24, e.g., pressure switch, moves from the second position to the first potion, i.e., opens so as to open the solenoid control circuit. The one-way exhaust valve 22 assists in the trailer in meeting the requirements of F.M.V.S.S. 121 S5.6.3.3 (Code of Federal Regulation, Title 49, Subtitle B, Chapter V, Part 571, Subpart B, Subsection 121, Section 5.6.3). As the air is exhausted from the spring brake chamber, the parking brake is actuated by way of the spring.

Figure 5:
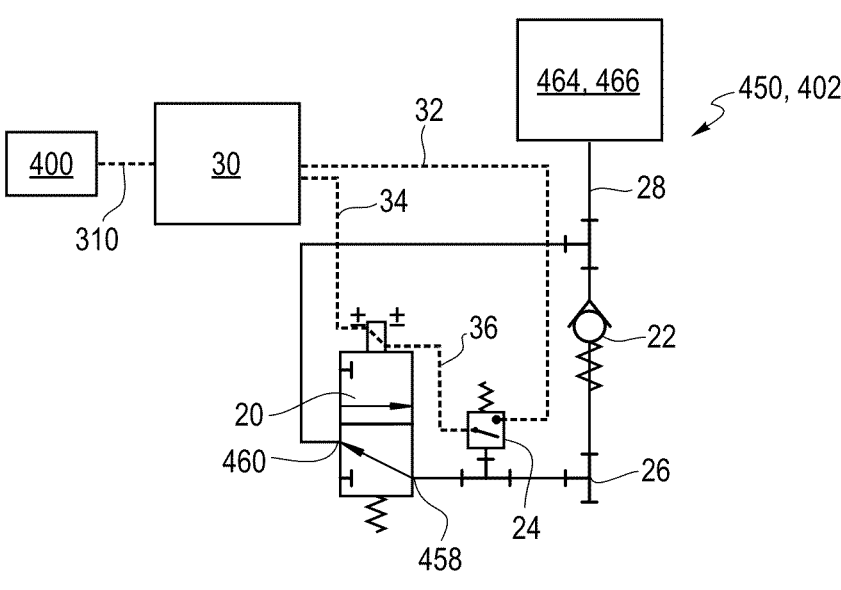
FIG. 5 is schematic illustration of one embodiment of the air brake system with the semi-trailer connected to shore power and no air supply connection.

Referring to FIG. 5, no air supply is connected to the trailer 402, but the trailer is connected to the shore power station 400. The shore power detection circuit 30 detects a power supply 310, converts the high voltage power supply 310 to a low voltage system power supply 320 and transmits a detection signal 325 to the solenoid valve 20, for example through an electrical supply and return by way of electrical lines 32, 34 respectively. With no air being supplied to pneumatic line 26, however, the normally open pressure switch 24 remains open and does not complete the electrical circuit through electrical line 36 leaving the solenoid valve 20 in an inactivated state. In this state, the supply port 458 and the delivery port 460 remain in fluid communication, albeit without any air passing through the solenoid valve 20 because there is no air supply, meaning the parking brake 466 remains engaged.

Figure 6:
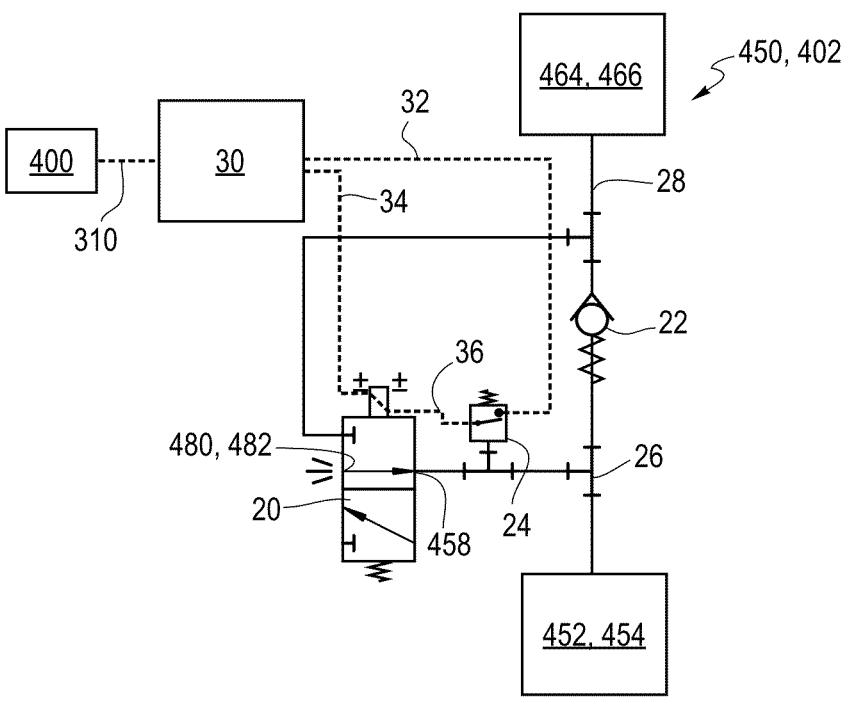
FIG. 6 is schematic illustration of one embodiment of the air brake system with the semi-trailer connected to shore power and to an air supply.

Referring to FIG. 6, the trailer 402 is connected to the shore power station 400 and to the air supply 452. The shore power detection circuit 30 provides an electrical supply and return actively present on electrical lines 32, 34. When air is supplied, the pressure switch 24 is moveable between, and moves from, the first position to the second position, or from a normally open to a closed position in one embodiment, such that electrical circuit is completed through line 36. The closing of the electrical circuit energizes the solenoid valve 20, and moves the solenoid valve 20 from the first position to the second position, such that the supply port 458 is put in fluid communication with an exhaust port 480. The exhaust port 480 communicates with the ambient environment, thereby exhausting any air supply through the exhaust port 480 of the solenoid valve 20, rather than directing the air supply to the parking brake 466. In this way, the air supply is diverted, or prevented from communicating with the spring brake valve 464 and parking brake 466 so as to maintain the parking brake 466 in an engaged position. If the operator attempts to move the trailer 402 with the tractor 454, the operator will be alerted that the shore power station 400 is connected to the trailer 402, for example by one or more alert components or alarms and/or by the lack of trailer 402 mobility due to the fact that the parking brake 466 remains engaged.

Referring to FIGS. 3-6, it should be understood that the solenoid valve 20, in the embodiment shown, moves between two positions, including (1) a first position, which is assumed when there is a) no power, with or without an air supply and input from the switch 24, or b) power supplied but no air supplied, and (2) a second position, which is assumed when there is power supplied and air supplied. In other words, the air is diverted to exhaust, and the parking brake remains engaged and the alarm is triggered, only if both power and supply-air are connected.

In operation, the solenoid valve 20 is moveable between (1) an air supply position when the power detection signal 325 is not being provided by the shore power detection circuit 30 and the pressure switch 24 is moved to the second position, and (2) a non-air supply position when the power detection signal 325 is provided by the shore power detection circuit 30 and the pressure switch 24 is moved to the second position. The "air supply position" refers to the first position of the solenoid valve, but where air is being supplied to parking brake 466. In other words, the parking brake 466 is operably connected to the air supply 452 when the solenoid valve 20 is in, or moved to, the air supply position. The parking brake 466 is configured to release when operably connected to the air supply 452. The non-air supply position may be defined as a venting or exhaust position, wherein the air supply is vented to the ambient environment when the solenoid valve 20 is moved to the venting or exhaust position. The audible alarm 330 may be operably connected to the solenoid valve 20, wherein the audible alarm 330 is configured to alarm when the air supply pressure is vented to the ambient environment.

One embodiment of a method of operating the air brake system 450 includes connecting the trailer 402 to the shore power station 400 that provides a shore power supply 310. The method further includes detecting the shore power supply 310 with the shore power detection circuit 30 and providing a shore power detection signal 325. The method may include disconnecting the tractor 454 and associated air supply 452 from the trailer 402, and emptying the spring brake chamber, for example by passing air through the one-way exhaust valve 22, and thereby setting the parking brake 466 by way of the spring. The method may further include thereafter connecting the tractor 454 and air supply 452 to the trailer 402 and thereby moving the pressure switch 24 from a first position (e.g., open position) to a second position (closed position) in response to the air supply. The method further includes moving the solenoid valve 20, disposed between the air supply 452 and the parking brake 466, to the exhaust position in response to detecting the shore power detection signal 325 and moving the pressure switch 24 to the second position. In the exhaust position, the air supply is diverted and not routed to the parking brake 466, but instead prevents the air supply from releasing the parking brake 466. In one embodiment, the method includes delivering an alarm as the solenoid valve 20 is moved to the exhaust position, whether by the sound of the air being vented through the port 480, or by sounding a horn 482, communicating with the port 480, with the air flow. Other alert indicia may include various visual indicia, such as lights, or audible indicia, such as an alarm. In addition, the operator is alerted that the shore power 310 has not been disconnected from the trailer 402 by way of the parking brake 466 being engaged which limits the mobility of the trailer 402. In response, the method of operation may further include the operator disconnecting the trailer 402 from the shore power supply 310, and thereby moving the solenoid valve 20 from the exhaust position to a supply position, supplying air to the parking brake 466, and releasing the parking brake 466.

Although the present invention has been described with reference to preferred embodiments, those skilled in the art will recognize that changes may be made in form and detail without departing from the spirit and scope of the invention. As such, it is intended that the foregoing detailed description be regarded as illustrative rather than limiting and that it is the appended claims, including all equivalents thereof, which are intended to define the scope of the invention.

What is claimed is:

1. An air brake release system comprising:
   a shore power detection circuit configured to provide a power detection signal when a shore power supply is detected;
   a switch moveable between a first position and a second position in response to an air supply; and
   a solenoid valve operably connected to the shore power detection circuit and the switch, wherein the solenoid valve is moveable between (1) an air supply position when the power detection signal is not being provided by the shore power detection circuit and the switch is moved to the second position, and (2) a non-air supply position when the power detection signal is provided by the shore power detection circuit and the switch is moved to the second position.

2. The air brake release system of claim 1 further comprising a parking brake operably connected to the air supply when the solenoid valve is the moved to the air supply position, wherein the parking brake is configured to release when operably connected to the air supply.

3. The air brake release system of claim 2 wherein the parking brake comprises a spring brake valve moveable in response to the air supply.

4. The air brake release system of claim 2 wherein the solenoid valve comprises a supply port in communication with the air supply, a delivery port in communication with the parking brake, and an exhaust port in communication with an ambient environment, wherein the air supply exits the delivery port and releases the parking brake when the solenoid valve is moved to the air supply position, and wherein the air supply exits the exhaust port when the solenoid valve is moved to the non-air supply position such that the parking brake remains engaged.

5. The air brake release system of claim 2 further comprising a one-way exhaust valve disposed between the air supply and the parking brake.

6. The air brake release system of claim 1 wherein the non-air supply position is a venting position, wherein the air supply is vented to an ambient environment when the solenoid valve is moved to the venting position.

7. The air brake release system of claim 6 further comprising an audible alarm operably connected to the solenoid valve, wherein the audible alarm is configured to alarm when the air supply pressure is vented to the ambient environment.

8. The air brake release system of claim 1 wherein the shore power detection circuit comprises a transformer configured to convert a high voltage shore power to a low voltage system power.

9. The air brake release system of claim 1 further comprising an alarm configured to provide a visual and/or audible alert when the power detection signal is provided by the shore power detection circuit and the switch is moved to the second position.

10. The air brake release system of claim 1 wherein the solenoid valve is moveable to the air supply position when the power detection signal is not being provided by the shore power detection circuit and the switch is moved to the first position.

11. An air brake release system comprising:
    a shore power detection circuit configured to provide a power detection signal when a shore power supply is detected;
    an air supply line;
    a switch moveable between a first position and a second position in response to an air supply delivered through the air supply line;
    an air delivery line; and
    a solenoid valve comprising a supply port in communication with the air supply line, a delivery port in communication with the air delivery line, and an exhaust port in communication with an ambient environment, wherein the solenoid valve is moveable between a first position, wherein the supply port and the delivery port are connected, and a second position, wherein the supply port and the exhaust port are connected, wherein the solenoid valve is moveable to the second position when the power detection signal is provided by the shore power detection circuit and the switch is moved to the second position.

12. The air brake release system of claim 11 further comprising a parking brake connected to the air delivery line.

13. The air brake release system of claim 11 further comprising an audible alarm connected to the exhaust port, wherein the audible alarm is configured to alarm when the solenoid valve is moved to the second position.

14. The air brake release system of claim 11 wherein the shore power detection circuit comprises a transformer configured to convert a high voltage shore power to a low voltage system power.

15. The air brake release system of claim 11 further comprising an alarm configured to provide a visual and/or audible alert when the power detection signal is provided by the shore power detection circuit and the switch is moved to the second position.

16. The air brake release system of claim 11 further comprising a one-way exhaust valve disposed between the air supply line and the air delivery line.

17. A method of operating an air brake system comprising:
    connecting a trailer to a shore power supply, wherein the trailer comprises a parking brake;
    detecting the shore power supply with a shore power detection circuit;
    connecting the trailer to an air supply;
    moving a switch from a first position to a second position in response to the air supply; and
    moving a solenoid valve, disposed between the air supply and the parking brake, to an exhaust position in response to detecting the shore power detection signal and moving the switch to the second position, and thereby preventing the air supply from releasing the parking brake.

18. The method of claim 17 further comprising delivering an alarm as the solenoid valve is moved to the exhaust position.

19. The method of claim 17 further comprising disconnecting the trailer from the shore power supply, moving the solenoid valve from the exhaust position to a supply position, supplying air to the parking brake, and releasing the parking brake.

20. The method of claim 19 further comprising disconnecting the trailer from the air supply, passing air through a one-way exhaust valve and setting the parking brake.

* * * * *